G. W. DURBROW.
METHOD OF AND MEANS FOR EXTRACTING MICRO-ORGANISMS AND SOLIDS FROM WATER.
APPLICATION FILED MAY 11, 1909.
1,006,070.
Patented Oct. 17, 1911.
2 SHEETS—SHEET 1.
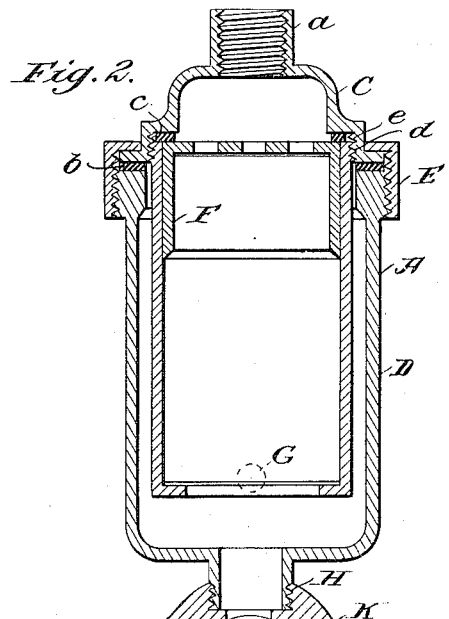
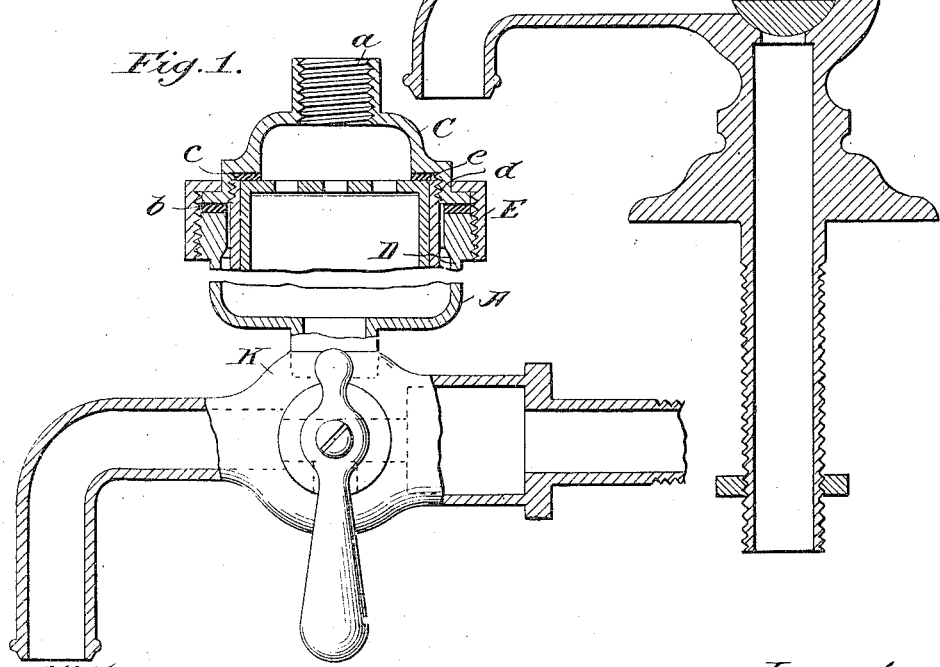
Witnesses:
E. L. Lenard
L. B. Stookey
Inventor:
George Walter Durbrow G. W. DURBROW.
METHOD OF AND MEANS FOR EXTRACTING MICRO-ORGANISMS AND SOLIDS FROM WATER.
APPLICATION FILED MAY 11, 1909.
1,006,070.
Patented Oct. 17, 1911.
2 SHEETS—SHEET 2.
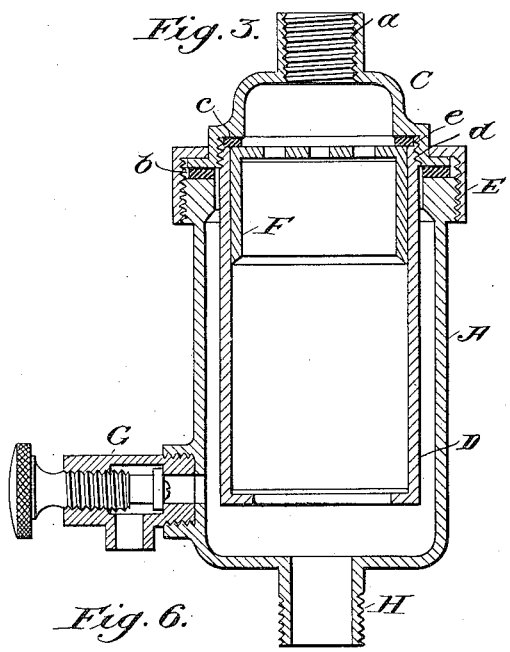
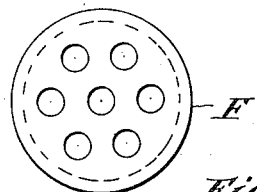
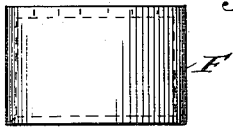
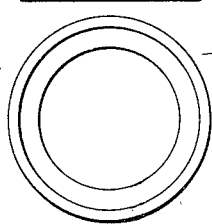
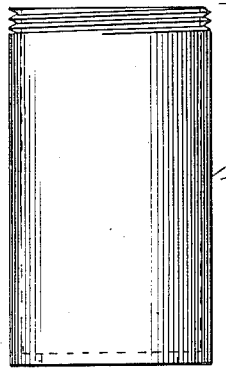
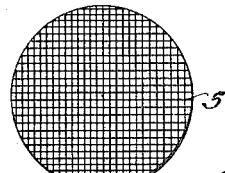
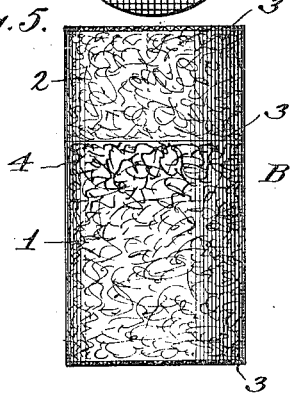
Witnesses:
E. L. Leman
L. B. Stookey
Inventor:
George Walter Durbrow

UNITED STATES PATENT OFFICE.

GEORGE WALTER DURBROW, OF LOS ANGELES, CALIFORNIA.

METHOD OF AND MEANS FOR EXTRACTING MICRO-ORGANISMS AND SOLIDS FROM WATER.

1,006,070.         Specification of Letters Patent.    Patented Oct. 17, 1911.

Application filed May 11, 1909. Serial No. 495,333.

*To all whom it may concern:*

Be it known that I, GEORGE W. DURBROW, a citizen of the United States, residing at Los Angeles, in the county of Los Angeles and State of California, have discovered and invented a new and useful Method of and Means for Extracting Micro-Organisms and Solids from Water, of which the following is a specification.

Objects of this discovery and invention are: First—the removal of micro-organisms and other objectionable matter from water. Second—the purification of water by a novel method and means which prevent the micro-organisms and solids from passing through filtering material. This is accomplished by employing a filtering button made of a compressed fibrous material prepared with a holding or sticky substance.

I have discovered that a fibrous material such as cotton, wool, flax or asbestos when made clean and free from germs or other objectionable matter by sterilizing treatment and compressed into a desired form or shape and of any desired size, and treated with a sticky or holding substance will serve to hold the micro-organisms and solids carried by the liquid to be filtered, and will prevent such organisms and solids from passing through such body when the body is held in such compressed form in a cage or holder invented for this purpose as hereinafter described.

The invention will be understood from the accompanying drawings.

Figures 1 and 2 are sectional views to illustrate a form of the filter apparatus. In Fig. 2 the apparatus is shown as applied with a faucet for a wash basin or a butler's pantry, and in Fig. 1 the same character of faucet is shown broken to contract the view and constructed to screw into a horizontal pipe. Fig. 3 is a cross sectional view of the body containing the cage or holder that contains the extractor and shows a valved outlet. Fig. 4 is a view of the perforated top of the cap that contains the upper button of the extractor. Fig. 5 is an elevation of two buttons and the linen disks employed in carrying out this discovery and invention. Fig. 6 is a view of one of the linen disks that are applied at top and bottom of the extractor buttons. Fig. 7 is a side elevation of the cage or holder from which the button shown in Figs. 5 and 6 has been removed. Fig. 8 is a view of the bottom of the cage or holder. Fig. 9 is a view of the cap that holds the upper button of the extractor.

In Fig. 2 A is the body that contains the cage or holder D which contains the extractor B that comprises the lower and upper buttons 1, 2. The detachable end C of the body A is provided with a threaded outlet *a*.

E is a union that connects the detachable end C to the body A.

F is a perforated cap that contains the upper button 2 of the extractor B.

*b* is a gasket that prevents leakage between the body A and detachable end C.

*c* is a gasket against which the cage or holder D is screwed to prevent any liquid from passing out of the body through the discharge end without first going through the extractor.

G is an opening into which the valved outlet in the body A is screwed. The threaded end *d* of the cage is screwed into the threaded part *e* of the detachable end of the body C.

H is the threaded inlet end of the body A by which said body is connected to the inlet and outlet three-way valve K.

Each extractor will be composed of upper and lower cylindrical buttons 1, 2, which are preferably made of absorbent cotton, owing to the fineness of the fiber and low cost of material, and are made in two sizes; the upper button being one-half the depth of the lower button; the diameter before assembling being practically the same as that of the diameter of the cage and when assembled the upper button is compressed into the cap F which fits inside the cage. The lower button has a sticky filling and is designed to receive and hold all the solid matter that is extracted from the liquid permitted to enter it. I do not hold rigidly to the rule that the buttons shall be made of different depths as satisfactory results may be had when that rule is departed from. In manufacturing the buttons the exact quantity of material is determined by weighing, the upper button having one-third and the lower button two-thirds the weight of the extractor. In manufacturing the buttons, when the fibrous material has been weighed it is placed in a tube that has a piston and a hollow piston rod. Steam under pressure passes through the hollow piston rod to the material and thoroughly sterilizes its material. The steam is shut off and the piston is forced (screwed) down onto the material and the material compressed as desired. The condensate from the steam is allowed to pass out at the bottom of the tube through small holes arranged for that purpose. Both buttons are prepared in this way. The buttons after being compressed and sterilized are forced into a tube with a linen disk 3 between them and are held under pressure in the tube until wanted for packing to go on the market. The lower button after being sterilized and compressed in the same manner as the upper button is forced into a tube leaving about one-eighth of an inch of the button outside of the tube. This end of the lower button is dipped into a melted sticky substance which may be a preparation of paraffin and gum heated to a temperature of at least 200 degrees Fahrenheit.

The sticky preparation can be made of different proportions, and different kinds of gum or balsam, and is treated with heat and other means until all coloring matter and odor have been removed, and will not dissolve or melt in water at a temperature up to 100 degrees Fahrenheit, but will maintain a sticky or holding nature. Gum copal may be used with the paraffin in proportions of one part gum to 20 parts of paraffin by bulk measure. Common pure beeswax may be used as a substitute for the composition of gum and paraffin.

After the lower button has been dipped in the sticky or holding preparation, the tube containing such button is placed over a heater, the treated end uppermost until the sticky or holding substance has been disseminated through the compressed fibrous material button to about one-half the depth of the lower button, the whole diameter being provided for. The sticky substance coats the fibers so that when water passes up through the buttons, thus passing between the fibers the sticky substance will catch any micro-organisms and solids carried by the liquid. Another method of treating the lower button is after the fibrous material has been prepared with steam and compressed to the size and density required and removed to the tube to receive the holding or sticky material the button is put into the tube so that the end to be treated is about one-half inch inside from the end of the tube. Then a disk made of the sticky or holding material and being the exact diameter of the button and of the quantity needed will be put into the tube on the end of the button to be treated. The tube is then placed on the heater until the sticky or holding material has been properly disseminated through the button. The lower and upper buttons are then alined and forced into a tube with a disk 3 of linen between them and kept in that tube under pressure until wanted for packing for the market.

The tubes used for compressing, storage, etc., can be made of glass, metal, or any other material suitable for the purpose. I am using a tube made of several thicknesses of paraffined paper made into different lengths to hold from one to a dozen of the single extractors made of two buttons up to one dozen extractors.

The operation of packing consists of forcing into the packing tube from the storage tube an upper and a lower button, the upper button being next to the treated end of the lower button, with disks 3 of linen at the upper and lower ends of the extractor; and another disk 3 between the buttons. The ends of the tubes are then hermetically sealed. The extractors are then ready to be transferred from the packing tubes to the cage or holder.

The method of extracting micro-organisms and solids from liquid consists in compressing a fibrous material that has been sterilized or otherwise treated and made clean and free from germs into a form, consisting of two buttons, that can be held in superposed compressed condition in a cage or holder; the lower button of the compressed fibrous material having been treated with a preparation of sticky or holding substance such as paraffin and gum or any other sticky or holding substance that will not dissolve or melt in liquid at a temperature of 100° Fahrenheit. The liquid enters at the bottom of the lower button and passes through both buttons and out at the top of the upper button. The lower part of the lower button is not treated with the sticky or holding substance, but being compressed, the liquid enters slowly, and all the large particles contained in the liquid are held from entering as the liquid passes on, the micro-organisms and fine particles are arrested and held by the sticky or holding substance and ultimately become a solid barrier in that portion of the treated lower button stopping the flow of liquid. Then a new extractor should be placed in the cage or holder.

The object of having the compressed material made into two parts or buttons, is, the upper button is placed against the treated end of the lower button for the purpose of preventing the sticky or holding substance from being forced out of the cage or holder by the pressure of the liquid. The compression of the fibrous material is for the purpose of slowing the speed of the liquid, so the particles can be held by the sticky or holding substance and separates from the liquid as the liquid passes through the extractor.

In this method of extracting the micro-organisms from water it may happen that two or more extractors should be placed in a cage or holder. This may be found desirable in filters for scientific purposes.

In Fig. 5 the two compressed buttons of fibrous material are shown placed together, the upper part of the lower button showing the preparation 4 with which it has been treated. The linen disks are shown at both ends of the extractor.

The sticky substance when disseminated as stated is absorbed by the fibers thus leaving the body still permeable to the pure liquid.

I claim:

1. The method of extracting micro-organisms and solids from water, which consists in catching such organisms and solids by bringing them into contact with a sticky substance held by fibrous material.

2. The method of extracting micro-organisms and solids from water, which consists in catching such organisms and solids by bringing them into contact with a sticky substance held by compressed fibrous material.

3. The method set forth of extracting micro-organisms from water, which consists in bringing such organisms and solids into contact with a sticky substance which is carried by compressed fibrous material and then passing the liquid through a body of compressed fibrous material, meanwhile holding the fibrous material in compressed condition in a catch or holder.

4. A filter comprising a body of compressed fibrous material a part of which has been treated with a substance that is sticky and adapted to hold micro-organisms or solids from passing when the filter is in use.

5. An extractor composed of compressed fibrous material such as cotton, wool, asbestos, etc., that has been sterilized by steam under pressure or otherwise treated for the purpose of making it clean and free from germs, a portion of said material carrying a sticky substance that will not dissolve or melt in water at a temperature of 100 degrees Fahrenheit.

6. An extractor composed of compressed buttons of fibrous material that has been made clean and free from germs, a portion of one button being treated with a substance that is sticky when the filter is in use for the purpose of arresting and holding micro-organisms and solids contained in the water to be filtered as the liquid passes through the compressed treated material.

7. An extractor composed of a compressed fibrous material made into two parts that has been made clean and free from germs and treated with a sticky substance and formed so the two parts are held in a compressed condition in a cage or holder by screwing the cage into the detachable end of the body.

In testimony whereof, I have hereunto set my hand at Los Angeles, California, this 3rd day of May, 1909.

GEORGE WALTER DURBROW.

In the presence of—
E. L. LEONARD,
L. B. STOOKEY.